Nov. 13, 1951　　　　W. J. HARLEY　　　　2,574,739
MOTORCYCLE REAR BUMPER, FENDER AND STAND ASSEMBLY
Filed May 9, 1949
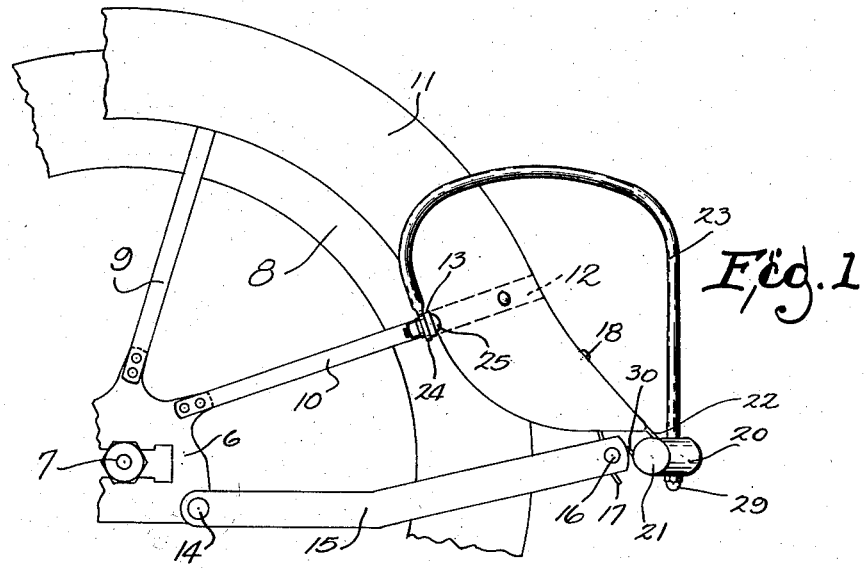
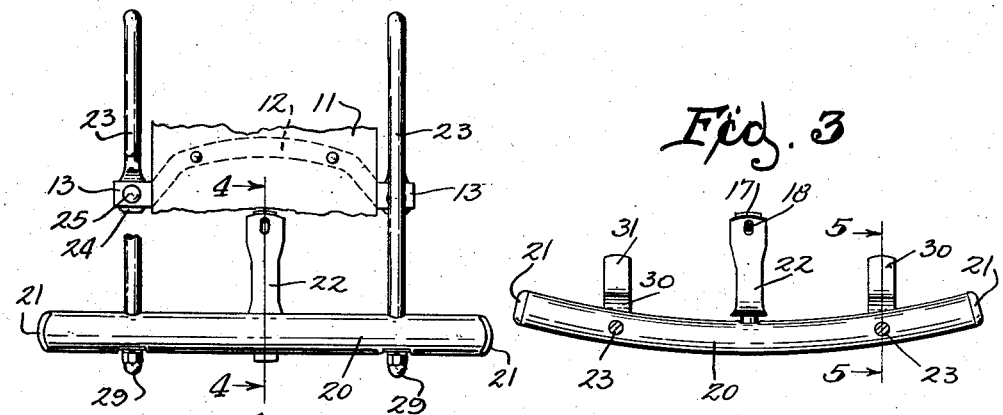
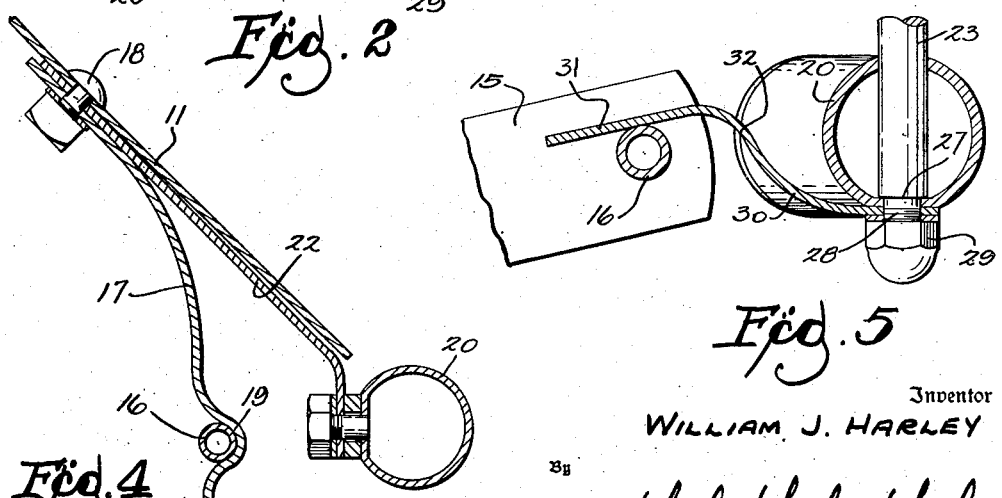
Inventor
WILLIAM J. HARLEY
By Wheeler, Wheeler + Wheeler
Attorneys Patented Nov. 13, 1951

2,574,739

UNITED STATES PATENT OFFICE 2,574,739

MOTORCYCLE REAR BUMPER, FENDER, AND STAND ASSEMBLY

William J. Harley, Milwaukee, Wis., assignor to Harley-Davidson Motor Co., a corporation of Wisconsin Application May 9, 1949, Serial No. 92,232

9 Claims. (Cl. 293—61)

1

This invention relates to a motorcycle rear bumper, fender and stand assembly.

It is a primary object of the invention to provide a rear bumper organization readily applicable to the fender of a motorcycle, to be supported on the fender and fender brackets, and to be adapted for limited yielding movement respecting the fender, thrust thereon ultimately being transmitted more directly to the motorcycle frame through the rear stand of the motorcycle.

More specifically, it is an object of the invention to provide a bumped adapted for fender and fender bracket mounting which will have a relatively high degree of resilience, but so designed that impact thereon will not overload the fender or fender bracket and has means for preventing the vibration which would ordinarily occur in a bar having a highly resilient mounting.

In the drawings:

Fig. 1 is a fragmentary view in side elevation of the rear portion of a motorcycle showing my improved bumper applied to the fender and fender bracket and in operative relation to the rear stand.

Fig. 2 is a fragmentary detail view in rear elevation of the parts shown in Fig. 1, portions of such parts being broken away.

Fig. 3 is a fragmentary detail view in plan of portions of the bumper shown in Fig. 1 and Fig. 2.

Fig. 4 is an enlarged detail view taken in section on the line 4—4 of Fig. 2.

Fig. 5 is an enlarged detail view taken in section on the line 5—5 of Fig. 3.

Although some of the parts illustrated in the drawing are conventional motorcycle parts, they comprise, in certain aspects of my invention, a new combination in conjunction with the bumper which is separately sold for use therewith.

The conventional apparatus includes the rear fork bracket 6 in which the axle 7 of wheel 8 is mounted in the usual manner and from which the arms 9 and 10 support the rear fender 11. Extending transversely of the rear fender 11 is a cross bar 12 having projecting ends at 13 with which the arms 10 are connected.

Pivoted to the frame fork member 6 by means of pintle 14 is the rear stand 15, which comprises a cross bar 16 which is shown in transverse section in Figs. 4 and 5. When the stand is not in use, it is supported by a clip 17 held by bolt 18 to the fender or mud guard 11. The clip 17 is resilient and has an offset 19 yieldably engaged about the cross bar 16 of the stand to support the

2 stand in a position from which it may be released by simply exerting down pressure upon it.

To the conventional parts as above described, my improved bumper is applied, the bumper being constructed as follows:

The bumper may comprise a bar 20 which may be tubular as shown in Figs. 3 and 4, but, if tubular, is preferably capped at 21 to close its ends as shown in Figs. 1 and 3. The bar may be horizontal in elevation as shown in Fig. 2, but is desirably arcuate in plan as shown in Fig. 3.

The bumper 20 is preferably mounted upon three springs. There is a central leaf spring 22 (Figs. 2, 3 and 4) which is bolted to the bumper and secured at its forward end to the bolt 18 which holds the clip 17 to fender 11. Near its ends, the bumper bar 20 is carried by the parallel spring arms 23, each of which comprises a resilient rod which desirably extends directly upwardly from the bumper and thence curves forwardly and downwardly to an apertured and flattened forward end 24 held by bolt 25 to the respective end 13 of cross arm 12. The spring rods 23 may be connected with the bumper bar 20 in any manner, but desirably extend diametrically therethrough as best shown in Fig. 5, and are shouldered at 27 to engage the inner bottom surface of the bumper, the threaded reduced extension 28 of each rod being engaged by clamping nut 29 which fixes its position respecting the bumper. The same nut 29 which maintains the bumper assembled upon each spring rod 23 also connects to the bumper the auxiliary leaf spring 30. Each of the leaves 30 has a forward end portion 31 offset by shoulder 32 to rest lightly on the cross bar 16 of the stand and serving as a steady rest to resist vibratory movement of the bumper on its supporting springs.

The springs 22 and 23 yieldably resist further displacement of the bumper respecting the motorcycle frame, but are relatively light. Consequently, vibration would be extreme were it not for the steady rest spring arms 30 which ride on the cross bar 16 of the retracted rear stand 15 and substantially completely preclude vibration.

In the case of an impact against the bumper 20, the bumper will readily move forward against the relatively light resilient resistance of springs 22 and 23, such resistance gradually increasing as the springs are tensioned. To prevent any overload of the fender 11 or its brackets 10, the arrangement is such that after a predetermined and relatively small forward displacement of the bumper, the bumper contacts the legs of the rear stand 15, thereby transmitting further thrust directly to the frame 6 and relieving the fender thereof.

I claim:

1. In a motorcycle having a frame fork, a fender and fender brackets supported from the frame fork, the combination with a transverse bumper and resilient supporting means therefor, said supporting means receiving support from the fender and fender brackets, a thrust receiving member supported from the frame fork and from which said bumper is normally spaced, the said bumper transmitting initial impact shock to the fender brackets and engaging said thrust receiving member upon the occurrence of a predetermined movement of said bumper to transfer further impact shock to the frame fork.

2. The device of claim 1 in which said thrust receiving member comprises a motorcycle stand movable between motorcycle support position and bumper thrust receiving position.

3. The device of claim 1 in which said resilient supporting means comprises a pair of spring rods extending curvilinearly from said fender to said bumper.

4. As a new article of manufacture for attachment to a motorcycle having a stand movable between support and retracted positions, a motorcycle rear bumper comprising a horizontal bar, and a pair of laterally spaced spring rods having anchorage portions and arched between said anchorage portions and said bar and connected with said bar to support the bar in spaced proximity to the stand when the stand is in retracted position.

5. The device of claim 4 in which the said bar is provided with a steady rest extending forwardly in a position to engage said motorcycle stand for resisting vibration of the bar upon said rods.

6. A rear bumper for use on a motorcycle having a frame fork and a fender supported therefrom and a rear stand pivoted to the frame fork and adapted for movement about its pivot between a substantially horizontal retracted position and a generally upright operative position, said bumper comprising a transverse bar having laterally spaced springs having anchorage portions and connected with said bar and extending curvilinearly from said bar to said anchorage portions for connection with said fender at opposite sides thereof, together with steady rest leaf springs connected with said bar at laterally spaced points and extending forwardly therefrom and provided forwardly of the bar with upward offsets, the said leaf springs having portions projecting beyond said offsets in positions to contact the stand in the retracted stand position, the bar being adapted to contact the stand consequent upon a predetermined forward yielding movement of said bar upon the springs first mentioned.

7. The device of claim 6 in which the fender is provided with a clip having a reversely bent portion constituting a yieldable detent for said stand, the bar having an additional spring centrally connected therewith and connected to the fender adjacent said clip.

8. A motorcycle rear bumper comprising a transverse tubular bar having upper and lower apertures of differential diameter and a pair of spring rods having forward anchorage portions and extending thence curvilinearly to said bar and entering the upper apertures therein, each of said rods having a shoulder and a threaded portion of reduced cross section projecting beyond its shoulder through a lower aperture of said bar, together with a retaining nut threaded on the reduced extremity of each such rod and maintaining its assembly with said bar, the shoulder of each rod seating within said bar.

9. The device of claim 8 in further combination with an apertured leaf spring with a vertical offset, the aperture of the leaf spring being engaged over the reduced and threaded extremity of one of said rods and retained by said nut.

WILLIAM J. HARLEY.

REFERENCES CITED

The following references are of record in the file of this patent:

UNITED STATES PATENTS

| Number | Name | Date |
|---|---|---|
| 1,104,443 | Packer | July 21, 1914 |
| 1,515,565 | Finnegan | Nov. 11, 1924 |
| 1,579,928 | Groesbeck | Apr. 6, 1926 |
| 1,601,641 | Ostria | Sept. 28, 1926 |
| 2,194,660 | Huff | Mar. 26, 1940 |